Sept. 11, 1962 W. R. KING 3,053,146
PHOTOGRAPHIC SLIDE PROJECTOR
Filed Jan. 4, 1960 4 Sheets-Sheet 1

INVENTOR.
WILLIAM R. KING
BY
ATTORNEY

Sept. 11, 1962 W. R. KING 3,053,146
PHOTOGRAPHIC SLIDE PROJECTOR
Filed Jan. 4, 1960 4 Sheets-Sheet 2

INVENTOR.
WILLIAM R. KING
BY
ATTORNEY

Sept. 11, 1962 W. R. KING 3,053,146
PHOTOGRAPHIC SLIDE PROJECTOR
Filed Jan. 4, 1960 4 Sheets-Sheet 3

INVENTOR.
WILLIAM R. KING
BY
ATTORNEY

Sept. 11, 1962    W. R. KING    3,053,146
PHOTOGRAPHIC SLIDE PROJECTOR
Filed Jan. 4, 1960    4 Sheets-Sheet 4

INVENTOR.
WILLIAM R. KING
BY
Francis A. Sinn
ATTORNEY

United States Patent Office 3,053,146
Patented Sept. 11, 1962

3,053,146
PHOTOGRAPHIC SLIDE PROJECTOR
William R. King, Denver, Colo., assignor to Minneapolis-Honeywell Regulator Company, Minneapolis, Minn., a corporation of Delaware
Filed Jan. 4, 1960, Ser. No. 202
13 Claims. (Cl. 88—28)

The present invention is concerned with an improved photographic slide projector and particularly with a photographic slide projector which incorporates among its novel features a magnetic type changer for controlling the movement of the slides between a slide storage tray and a projection compartment within the slide projector.

The photographic slide projector of the present invention incorporates a projection or optical axis which is defined by a projection lamp, a condensing lens system, a slide projection compartment, and a movable objective lens. While a light shutter is also conventionally used, it is not shown in the present application for the purpose of simplifying the drawings. Included with this arrangement defining the projection axis is a slide changing means incorporating a permanent magnet which is arranged to move from one side of the projection axis to the other. This permanent magnet is aligned with and cooperates with the slide projection compartment so as to magnetically engage slides and, by means of movement of the magnet, move the slides from a slide storage tray to the projection compartment wherein the slides are aligned with the optical axis of the projector.

Such a construction results in a slide projector which produces very little wear on the slide and which does not injure the slide if the slide tray is improperly positioned. Prior art projectors for the most part use a push rod or the like to push the slide from the slide storage tray. In this type construction, should the slide jam, the slide itself is destroyed. In the apparatus of the present invention should the slide jam, the magnetic couple between the permanent magnet and the slide is broken and the slide is not damaged.

In the preferred embodiment of the present invention, the slide storage tray comprises an open-face box-like structure having a plurality of individual compartments, each adapted to receive an individual photographic slide and to hold the plurality of slides in a face to face relationship. An edge surface of each of the slides projects out of the open face of the slide storage tray and this edge surface has a magnetic portion which is adapted to be attracted by the magnet.

The slide changing means cooperates with and controls a slide tray advancing means such that movement of the slide tray is synchronized or coordinated with movement of the magnet between a slide changing position, wherein the magnet returns the slide to the tray, and a slide projecting position, wherein the magnet moves a slide from the tray to the projecting position. Specifically, the slide changing means and the slide tray advancing means are so constructed and arranged that upon the slide changing means returning a slide to the tray, the magnet is locked in position, and further movement of the slide changing means actuates the slide tray advancing means to advance the slide tray one position and thereby position a succeeding slide in cooperating relation with the magnet. This new slide can then be moved into the slide projection compartment of the projector.

Furthermore, the slide changing means is arranged to control a slide tray lock which is effective to lock the slide tray and prevent accidental movement thereof while a slide is being moved from the slide tray to the slide projector position. In this manner, jamming of the slide while it is only part way out of the slide tray is avoided and the return of the slide to its proper position within the slide tray is insured.

A further feature of the present invention resides in means whereby the slide projector is adapted to receive either a large or a small size slide. These slides are referred to as the 2¼ by 2¼ slide, which due to the mounting arrangement actually measures 2¾ by 2¾ inches, or 2 by 2 slide. The slide projector incorporates a slide tray platform which is adapted to receive the slide tray for the 2¼ by 2¼ slides. This slide tray includes a rack-like member in which gear teeth are formed to cooperate with the slide tray advancing means of the projector. When the 2¼ by 2¼ slide tray is positioned on the slide tray platform, the open face of the slide tray moves across a pair of slide receiving windows in a wall of the projector. These windows are adapted to selectively receive either the large or the small slide and a blocking member is manually movable to block one or the other of the windows, depending upon which size slide is to be projected. When the 2 by 2 slide is to be projected, an adapter member is placed in position on the slide tray platform, much in the manner in which the 2¼ by 2¼ slide tray is positioned on the platform. This adapter member includes a similar rack arrangement and also includes means to mount the smaller slide tray such that its open face is aligned with the slide receiving windows in the wall of the projector, and such that the slides within the smaller tray move past these windows as the slide tray advancing means operates.

As is well known, photographic slides may be bound in cardboard type frames, or may be bound in metallic or plastic frames. In the event that the slides being utilized are mounted in cardboard or plastic type frames, or in metallic frames which are non-magnetic, a small clip of magnetic material is positioned over the edge of the slide which protrudes out of the open face of the slide storage tray. In some cases, the slides may be bound in a metal which is magnetic and which will be attracted by the permanent magnet and in this case the small magnetic clip is not necessary.

A further features of the present invention includes a manually movable lever which cooperates with the slide tray advancing means and conditions this slide tray advancing means to move the slide tray in one direction or the other. These directions can be designated a forward and a reverse direction and by means of this manual lever, it is possible to cause the slide tray to move in a forward direction, or to move in a reverse direction if it is desired to repeat the showing of a particular slide.

Thus far, the present invention has been described only in general terms. The exact nature of the present invention will be apparent to those skilled in the art upon reference to the following specification, claims, and drawings, of which:

Figure 1:
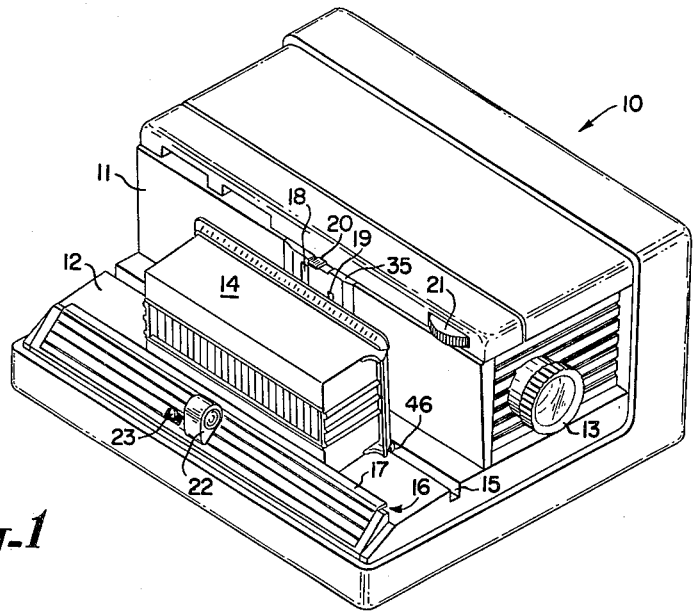
FIGURE 1 is a perspective view of the improved photographic slide projector, showing the large, or 2¼ by 2¼, slide tray in position on the slide tray platform of the projector.

Referring specifically to FIGURE 1, reference numeral 10 generally designates the projector case having a side wall 11, a slide tray platform 12, and a movable objective lens 13 extending out of an opening in a forward wall of the case.

Reference numeral 14 designates a slide storage tray of the large or 2¼ by 2¼ size. This slide tray is positioned on the slide tray platform of the projector and an elongated ridge and rack member 46, see FIGURE 3, slides along a channel 15 formed in the slide tray platform. Furthermore, slide tray 14 is provided with a second ridge 45 which is positioned in a slot 16 formed in the slide tray platform, and specifically formed by an overhanging plate 17.

Figure 9:
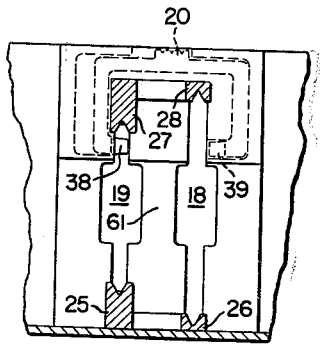
FIGURE 9 is a section view taken generally along the line 9—9 of FIGURE 3, showing details of the member which blocks the large or small slide receiving window in the side wall of the projector.

The reference numerals 18 and 19 designate the large and small slide receiving windows formed in the wall 11 of the projector case (see FIGURE 9). The full showing of these windows is partially blocked in FIGURE 1 by slide tray 14 and the reference numeral 20 designates the manually movable lever which controls and which is effective to block one or the other of the windows 18 and 19. In the showing of FIGURE 1, the lever 20 is moved to the left and in this position the small slide window 19 is blocked, as can be seen more clearly in FIGURES 2 and 9.

Reference numeral 21 of FIGURE 1 designates a manual knob which is effective to control the focusing of the projector by controlling the position of the objective lens 13.

Operation of the slide projector of FIGURE 1 is controlled by a manually movable control knob identified by the reference numeral 22. This member is shown in FIGURE 1 in the position in which a slide is being projected, that is, the slide is positioned in alignment with the optical axis of the projector, as can be seen more clearly in FIGURE 2, the slide being identified by reference numeral 36. As will be shown, movement of knob 22 in an outward direction causes a control rod of the slide changing means to also move, and this in turn actuates the slide tray advancing means, the slide tray lock, and other associated mechanisms of the projector.

Reference numeral 23 of FIGURE 1 designates the manual movable lever which controls the direction of movement of slide tray 14. In FIGURE 1 this member is positioned in a forward position and thereby conditions the slide tray advancing mechanism to move the slide tray 14 in a forward direction, that is to the right as shown in FIGURES 1 and 2.

Figure 2:
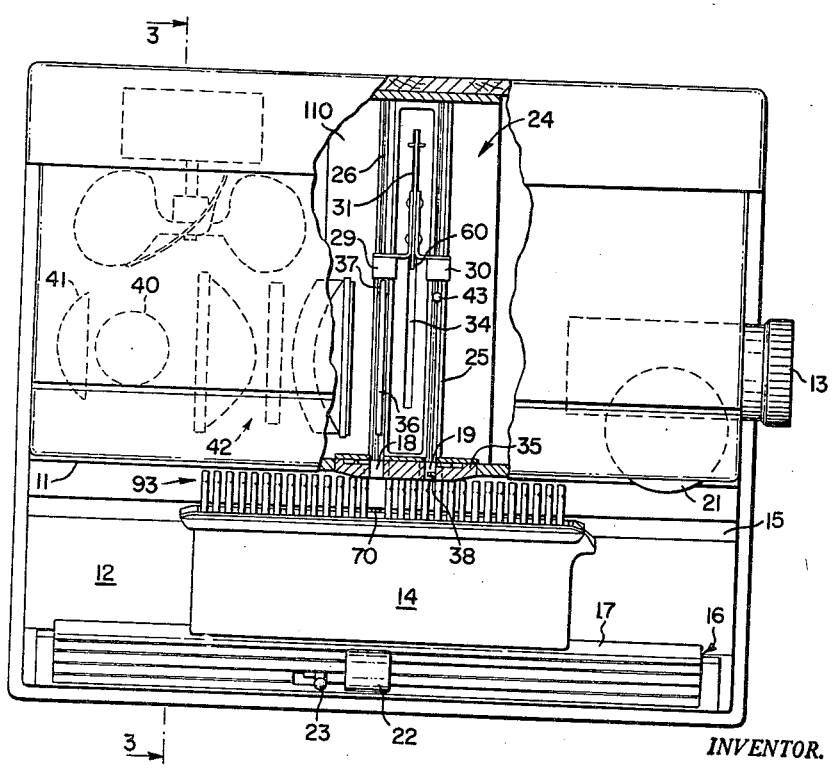
FIGURE 2 is a top view of the projector of FIGURE 1, to a slightly larger scale, showing a portion of the top wall of the projector broken away to disclose details of the slide receiving compartment and of the means which selectively blocks one or the other of the slide receiving windows in the side wall of the projector.

Referring now to FIGURE 2, this view is a top view of the projector as shown in FIGURE 1, wherein a portion of the top of the projector case is broken away to disclose a slide projection compartment, designated generally by means of the reference numeral 24. This compartment includes a pair of lower guide members 25 and 26 adapted to cooperate with the small and the large size slides respectively. These guides can also be seen in FIGURE 3 wherein the upper guides 27 and 28 are also shown, members 25 and 27 making up guide means for the small slide whereas members 26 and 28 make up guide means for the large slide. These members 25–28 are also seen in FIGURE 9, where they are shown in cross section.

Figure 3:
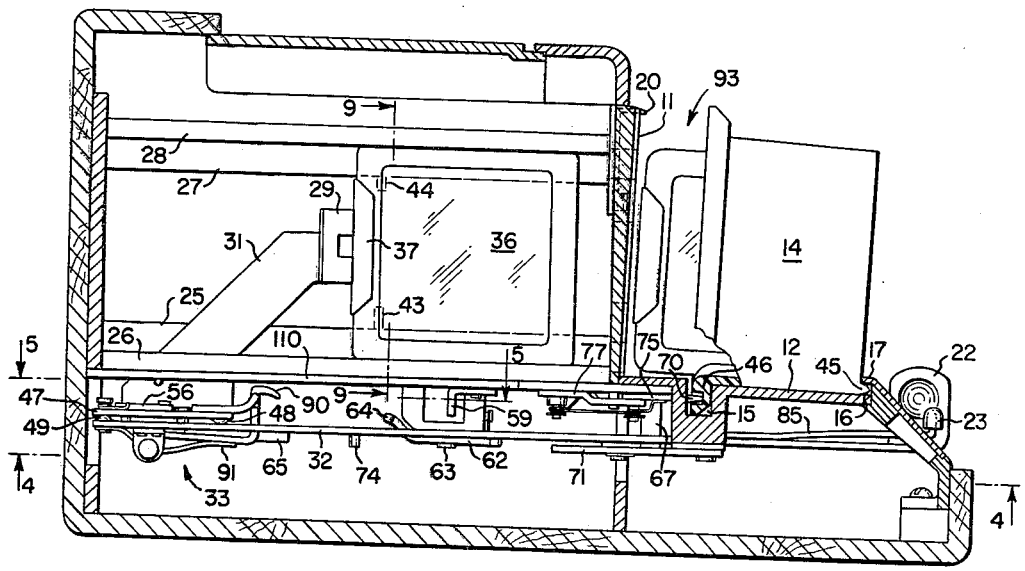
FIGURE 3 is a section view of FIGURE 2, taken along the line 3—3, showing a 2¼ by 2¼ slide in the projection compartment of the projector.

Reference numerals 29 and 30 designate two permanent magnets which are mounted on a magnet support member 31, see FIGURES 2 and 3, which support member is in turn mounted on a control rod 32, this mounting being accomplished by means of a lost motion or overtravel type coupling mechanism 33, which mechanism will be more completely described.

Figure 4:
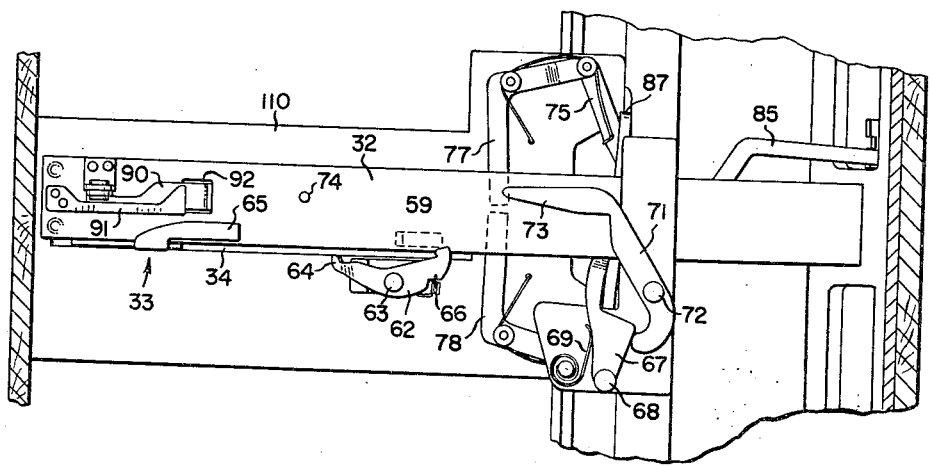
FIGURE 4 is a partial section view of FIGURE 3 taken along the line 4—4, showing the slide changing means in the slide projecting position, and showing a portion of the slide tray advancing means.
Figure 5:
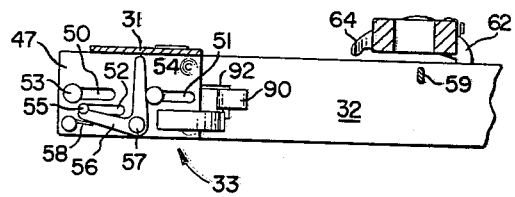
FIGURE 5 is a partial section view taken along the line 5—5 of FIGURE 3, showing a portion of the slide changing means in the slide projection position, as well as the means which mounts the permanent magnets.
Figure 6:
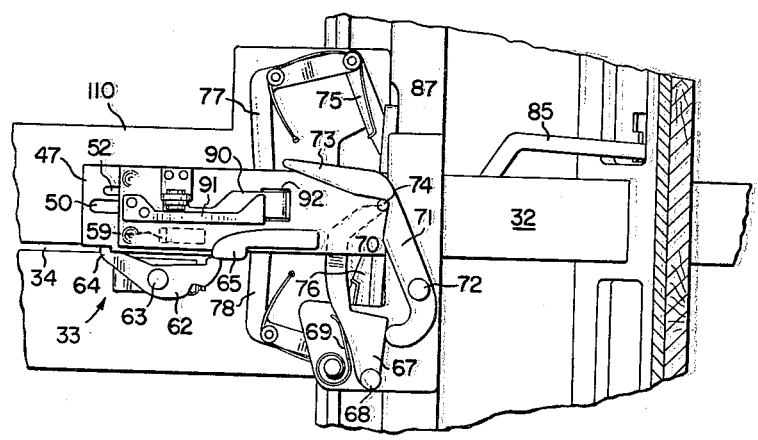
FIGURE 6 is a view of the slide changing means and the slide tray advancing means, showing the slide tray advancing means in a position wherein a slide has been returned to its proper position within the slide tray and the slide tray has been unlocked.

Control rod 32 is connected to knob 22, and the configuration of control rod 32 as well as the lost motion or overtravel means 33 can also be seen in FIGURES 4 and 5. FIGURE 6 also shows these members, but shows the mode of operation of means 33 wherein the lost motion or overtravel has been taken up by movement of control rod 32, as will be described.

Referring again to FIGURE 2, it suffices to say at this time that movement of control lever 22 in a downward direction, as seen in FIGURE 2, causes magnet support member 31 to move downward through slot 34 formed in a portion of the case identified by reference numeral 110 until magnets 29 and 30 enter windows 18 and 19 and return slide 36 to the slide tray 14. As can be seen in FIGURE 9, windows 18 and 19 are provided with enlarged portions in the center thereof, which enlarged portions are adapted to receive the magnets and allow these magnets to pass into the windows until the front surface of the magnets is substantially flush with the outer edge of the wall 11 of the projector case 10. In practice, it is desirable to form the walls 18 and 19 in a portion of the projector side wall identified by the reference numeral 35, which portion of the side wall is constructed of a non-magnetic material.

Figure 10:
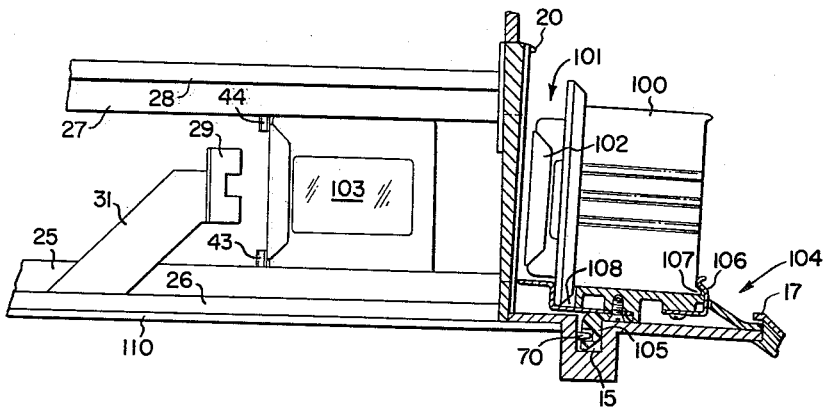
FIGURE 10 is a view showing the slide tray adapter, and showing the small or 2 by 2 slide tray in position on the adapter.

In FIGURE 2, the projector is shown with control knob 22 in its project position in which a large 2¼ by 2¼ slide 36 has been magnetically withdrawn from one of the central compartments of the slide tray 14 and is now positioned in the project position within the projection compartment 24 of the projector. As shown, this slide is a cardboard bound slide and therefore a metal magnetic clip 37 is mounted on the edge of the slide 36 which cooperates with magnet 29. The plurality of slides, designated by reference numeral 93, are also provided with magnetic clips, as viewed in FIGURE 3. Since the projector is being used with the large size slide, the control member 20 is positioned such that the small slide receiving window 19 is blocked by a blocking member identified by reference numeral 38 of FIGURES 2 and 9. As can be seen more clearly in FIGURE 9, member 20, when in the large slide position, moves a generally U-shaped member to the right and thereby positions the blocking member 38 to block window 19, while allowing magnet 30 to enter this window. In the event that the projector is being used with the relatively small 2 by 2 slides, as shown in FIGURE 10, then member 20 is moved to the left as shown in FIGURE 9, or to the right as shown in FIGURE 1. This withdraws blocking member 38 from window 19 and positions blocking member 39 at window 18, to block this window in much the same manner, while allowing magnet 29 to enter the enlarged portion of this window. As can be seen in FIGURE 2, magnets 29 and 30 each have a U-shape so as to provide a recess to clear blocking members 38 and 39 to allow the face of the magnets to move to a position substantially even with the side wall 11.

A feature of the present invention resides in the manner in which the large and small slides are positioned in spaced relationship along the optical axis of the projector, to provide optimum illumination efficiency for the two different size slides. This can be readily understood by reference to FIGURE 2 wherein the reference numeral 40 designates a projection lamp which, in cooperation with a reflector 41, causes light to be transmitted through a condensing lens system designated generally by means of the reference numeral 42. As the light rays leave the condensing lens system, the light is focused in a solid cone of light which enters the objective lens 13. At the position occupied by the large size slide guide means 26—27, the full cone of light is taken up by the large size slide 36. In the event that the projector is used with a small slide, then the small size slide guide means 25—27, which is positioned closer to the objective lens, positions a small slide at the point in the cone of light where it is also illuminated by substantially all of the light existing within the cone of light. As an aid in positioning the small slide, pins or stops 43 and 44 are formed in the guides 25 and 27 (see FIGURE 3). These pins stop the small slide as it is moved into the projection position by movement of magnet 30, as shown in FIGURE 10. When the small slide engages pins 43 and 44, the slide is stopped at this position and the magnetic engagement between magnet 30 and the clip on the edge of the small slide is broken such that the magnet 30 continues moving to the position shown in FIGURE 2. With such a construction, not only does the projector of the present invention facilitate the convenient projection of either the large or the small slide, but also the illumination efficiency remains constant since all of the light which leaves the condensing lens systems 42 is used to illuminate the slide, whether it be the large slide positioned in the guide means 26 and 28 or the small slide positioned in the guide means 25 and 27.

In FIGURE 10, reference numeral 100 identifies a small size slide tray of the same general shape as slide tray 14, but smaller. Disposed within slide tray 100 are a plurality of small 2 by 2 slides 101, having metal clips 102. One of the slides 103 is shown in projecting position. Slide tray 100 is positioned on a slide tray adapter 104 having a rack 105 similar to the rack 15 of the large size slide tray 14. In this manner, adapter 104, carrying small size slide tray 100, is moved in much the same manner that slide tray 14 of FIGURE 3 is moved, as will be described. Adapter 104 carries a spring clip 106 to engage and hold the lip 107 formed along the edge of slide tray 100. Also, adapter 104 is provided with a recess 107 to receive a further ridge formed along an edge of tray 100.

Thus far, the explanation has dealt primarily with the slide changing mechanism and the manner in which the slides are moved from the slide tray 14 to the projecting position as shown in FIGURE 2. Cooperating with the mechanism above described is a slide tray advancing mechanism which is effective to move the slide tray in one direction or the other, under the control of lever 23, to thereby bring a second slide into mating position with the magnet presently operative to move a slide into the project position.

As has been mentioned, magnets 29 and 30 are carried by a magnet support member 31 (see FIGURE 3). This magnet support member is provided with a horizontally disposed plate identified by the reference numeral 47, plate 47 being spaced from the operating bar 32 by means of a dimple 48 formed in plate 47 and a dimple 49 formed in bar 32. As can be seen in FIGURE 5, plate 47 includes three elongated slots 50, 51 and 52. The slots 50 and 51 receive pins 53 and 54 respectively, whereas slot 52 receives pin 55. These three pins are rigidly attached to bar 32, and pins 53 and 54 are provided within enlarged heads so as to provide a means of mounting the slide support member 31 and its plate 47 on bar 32. The coupling between the members 47 and 32, as afforded by slots 50, 51 and 52, is such as to provide a lost motion, or overtravel type coupling. With the apparatus as shown in FIGURES 3 and 5, pin 55 is locked in position by means of an L-shaped lever 56, this lever being pivoted at 57 and being biased for rotation in a clockwise direction by means of spring 58. Reference numeral 59 of FIGURES 3 and 5 designate a stop member, fixed to the projector case, which cooperates with a portion of lever 56 to rock this lever in a counter-clockwise direction as the bar 32 moves to the right to a position wherein lever 56 engages stop 59. When this occurs, pin 55 is released, thereby allowing relative movement between plate 47 and bar 32 such that the lost motion connection or overtravel can be taken up, at the end of which overtravel the apparatus 33 assumes a position as shown in FIGURE 6.

Movement of the magnets, the magnet support member 31, and the plate 47 from the slide projecting position to the slide changing position is stopped when these members reach the slide changing position by means of a stop member 60 located between magnets 29 and 30 (see FIGURE 2). Stop 60 is adapted to engage the inner surface of side wall 11 of the projector case, and namely that portion of the wall existing between the enlarged portions of windows 18 and 19, this portion of the wall being identified by reference numeral 61 of FIGURE 9.

As the magnets stop at the slide changing position, plate 47 is locked in position by means of a locking pawl 62 which can be seen in FIGURES 3, 4, 5 and 6. As shown in FIGURE 4, this pawl is pivoted on the projector case at pivot 63 and is provided with an offset arm 64 having a hooklike portion adapted to engage elements 31 and 47 and to lock this plate, as shown in FIGURE 6. The locking pawl is actuated by a cam member 65 carried by control rod 32. As can be seen in FIGURE 4, the locking pawl 62 is normally biased by means of a spring 66 for counter-clockwise rotation. Upon control rod 32 moving to the right, the righthand extension of locking pawl 62 is engaged by cam member 65 and is rotated in a clockwise direction against the bias of spring 66. It is then held in this position, as shown in FIGURE 6, and in this position the hooklike portion 64 engages elements 31 and 47 to prevent its movement. Elements 31 and 47 are then held in this intermediate position, movement in one direction being prevented by stop 60 engaging the portion 61 of projector side wall 11, and movement in the opposite direction being prevented by the hooklike portion 64 of locking pawl 62.

As has been mentioned, the lost motion or overtravel of arm 32 beyond this intermediate position is utilized to control means including the slide tray advancing means and the slide tray locking means.

Considering first the slide tray locking means, this arrangement includes a locking member 67 which is pivoted on the projector case at 68 and is biased for clockwise rotation by means of a spring 69, see FIGURES 4 and 6. With the parts as shown in FIGURE 4, wherein the operating bar 32 is in the slide projecting postion, an extension 70 of the locking member, shown by the broken lines of FIGURES 6 and 8, extends into and locks the slide tray 14, as shown in FIGURE 3.

The locking member 67 is in turn controlled by a cam member 71 which is pivoted on the projector case at 72 and has an extension 73 adapted to coact with a pin 74 carried by the operating bar 32. As the operating bar 32 moves from the slide projecting position of FIGURE 4 to the slide changing position of FIGURE 6, pin 74 engages the lower surface of extension 73 and causes member 71 to rotate in a clockwise direction about pivot 72. This in turn causes member 67 to rotate in a counter-clockwise direction about pivot 68, both members 71 and 67 rotating against the bias exerted by spring 69. Rotation of member 67 in a counterclockwise direction causes the extension 70 of this locking member to withdraw from the rack formed on the bottom surface of slide tray 14 and the extension 70 assumes the position shown in FIGURES 7 and 8. The slide tray is now unlocked and the slide tray is in a condition to be moved by the slide tray advancing mechanism.

Figure 7:
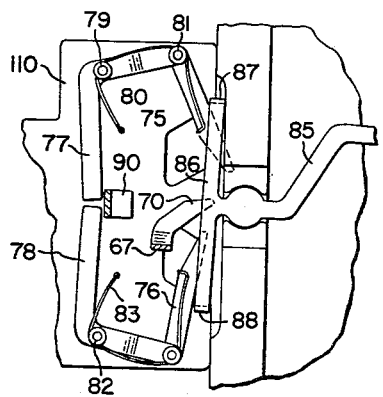
FIGURE 7 is a view showing particularly the slide tray advancing means in the position of FIGURE 6, and showing the manner in which a manually movable lever controls the direction of movement of the slide tray.

This slide tray advancing mechanism can be seen most clearly in FIGURES 4, 6, 7 and 8. Referring to FIGURE 7, the slide tray advancing mechanism includes a pair of driving pawls 75 and 76 which are pivoted on L-shaped levers 77 and 78 respectively. Lever 77 is mounted on the projector case by means of a pivot 79 and is biased by means of a spring 80 to rotate in a counter-clockwise direction above pivot 79. Spring 80 also extends around pivot 81, by which driving pawl 75 is mounted on the extension of the L-shaped member 77, and the extension of spring 80 biases the driving pawl 75 for counter-clockwise rotation about its pivot 81.

Likewise, L-shaped member 78 is mounted on the projector case by means of a pivot connection 82 and a similar spring 83 is provided to bias the members 76 and 78, member 78 being biased for clockwise rotation and member 76 being biased for clockwise rotation.

The position of driving pawls 75 and 76 in relation to gear rack 46 formed in the slide tray 14 is controlled, as has been mentioned, by the manually operable lever 23. This lever 23 is an extension of a T-shaped yokelike member 85 which can be most clearly seen in FIGURE 7. This member 85 includes a T-shaped portion 86 having short turned up portions at the ends 87 and 88. These turned up portions cooperate with driving pawls 75 and 76 and control the positions of the driving pawls. As has been mentioned, member 23 in FIGURE 1 is in a position to cause the slide tray to move in a forward direction, that is to the right as shown in FIGURE 1. This is also the corresponding position of the T-member 85 as it is seen in FIGURES 4, 6 and 7. In this position, T-member 85 is tilted so that driving pawl 76 is rotated in a counter-clockwise direction, out of engagement with the gear rack formed in the bottom of the slide tray 14. Driving pawl 75 on the other hand rotates in a counter-clockwise direction so as to be placed in a position wherein it engages the rack of the slide tray.

If it is desired to cause slide tray 14 to move in the reverse direction, then member 23 is moved to the left as shown in FIGURE 1 and the T-member 85 is tilted in the opposite direction so as to move the driving pawl 75 out of engagement with the rack and to allow driving pawl 76 to move into engagement with the rack.

The actual driving movement of the operative driving pawl is controlled by operation of control bar 32. Referring again to FIGURE 3, control bar 32 carries a catch member 90 which is mounted on a pivot at the underside of control bar 32 and is biased in an upward direction by means of a leaf spring 91. Member 90 extends through an opening 92 in the control bar 32, as can be seen in FIGURES 4 and 6.

Figure 8:
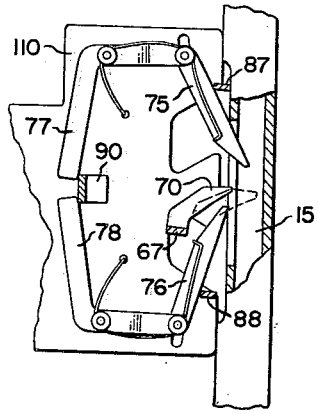
FIGURE 8 is a view similar to FIGURE 7 in which the slide changing means has partially advanced the slide tray, and showing the slide tray lock in its full line or unlocked position and in its dotted line or locked position.

As the control bar 32 moves from the slide projecting to the slide changing position, the upper portion of member 90 engages members 77 and 78 and is cammed down to pass under these members to assume the position shown in FIGURE 7. As the control rod 32 returns from the slide changing to the slide projecting position, the upper portion of member 90 engages members 77 and 78 and causes both of these members to rotate, as is shown in FIGURE 8. As a result of this rotation, the driving pawls 75 and 76 are both moved, the pawl 75 moving in a downward direction and the pawl 76 moving in an upward direction. However, since the T-spaced member 85 is now in a position to drive the slide tray 14 in a forward direction, only driving pawl 75 engages the rack formed in the slide tray, and therefore this pawl, in moving in a downward direction, causes the slide tray to move. It will be remembered that the various FIGURES 4, 6, 7 and 8 are bottom views of the mechanism as shown in FIGURE 1 and therefore the downward movement of driving pawl 75 of FIGURE 7 for example causes the slide tray 14 of FIGURE 1 to move to the right. The distance of this movement is equivalent to the spacing of the individual slides in the slide tray, as shown in FIGURE 2, and brings a succeeding slide into position where it is attracted by magnet 29 now positioned within window 18.

The above mentioned operation, wherein the slide tray is unlocked and the slide is advanced, takes place during the time in which the control rod 32 is taking up the lost motion or overtravel provided between this rod and the magnet carying member 31, as has been above described.

Referring now to FIGURE 6, as control rod 32 moves to the left toward the slide projecting position, the locking cam 65 moves to the point whereat locking pawl 62 releases plate 47. This takes place at the same instant that the lost motion or overtravel has been taken up and as a result, plate 47, magnet supporting member 31, and the magnets move to the left, causing L-shaped lever 56 of FIGURE 5 to leave stop 59. Therefore lever 56 rotates in a clockwise direction under the bias of spring 58 to again latch and lock the plate 47 with respect to control rod 32.

The above completes a detailed description of the mechanism of the present invention and to summarize the operation thereof, the control rod 32 moves between a slide viewing position as shown in FIGURE 4 and a slide changing position as shown in FIGURE 6. Magnets 29 and 30 are carried by control rod 32 by means of a lost motion or overtravel connection. As the control rod returns from a slide projecting position to the slide changing position, the slide which has been projected is returned to the slide tray and the magnets are locked in position. The control rod then continues further movement by way of the lost motion connection and is first operable through means including pin 74 to unlock the slide tray. As the control rod 32 is then moved in the reverse direction, that is from the slide changing toward the slide projection position, member 90 carried by the control rod is effective to cause the driving pawls 75 and 76 to move and one of these pawls, as controlled by lever 32, is effective to drive the slide tray in a reverse or a forward direction a distance equal to the spacing of the slides within the slide tray. Furthermore, once this driving action has been completed, pin 74 has moved out of engagement with member 71 and the slide tray is again locked. At substantially the same time, the lost motion between the members supporting the magnets and the control rod 32 is taken up and lock pawl 62 is released to allow a slide to be pulled into the slide projecting compartment by way of magnetic attraction. From this it can be seen that should the slide stick or jam, the slide is not damaged but remains in its stuck position as the magnet continues moving to the slide projecting position. The projector operation may then free the slide.

Other modifications of the present invention will become apparent to those skilled in the art and it is therefore intended that the scope of the present invention be limited solely by the scope of the appended claims.

I claim as my invention:

1. A slide projector for use with a slide storage tray having compartments holding a plurality of slides, each of which includes a magnetic surface on an edge portion thereof, comprising: means defining an optical axis along which a slide is adapted to be projected on a screen, a movable control member to control the projection of the individual slides one at a time in succession, a magnet mounted in relation to said control member by a lost motion coupling and arranged to be moved from one side of said optical axis to the other as said control member moves between a slide projecting position and a slide changing position, said magnet being positioned at a first side of said optical axis to position a given slide in alignment with said optical axis for projection thereof as said control member is moved to said slide projecting position, said magnet moving to a further position on the opposite side of said optical axis to return the given slide to its slide tray compartment as said control member moves toward said slide changing position, stop means effective to stop and to lock said magnet in said further position as said control member continues to move a further distance to said slide changing position, slide tray advancing means adapted to move the slide tray, means controlled by said control member during movement through said further distance to actuate said slide tray advancing means, and lock means controlled by said control member and adapted to lock said slide tray at all times during which said magnet is not locked in said further position.

2. In a photographic slide projector adapted to selectively project either large or small size slides, each of which slides is provided with an edge surface of magnetic material, optical means including a light source and condensing system, and an objective lens arranged to project light along an optical axis; a slide changing mechanism having a pair of magnets spaced along said optical axis between said condensing system and said objective lens and movable across said optical axis, support means adapted to receive and support slide trays holding a plurality of individual slides of either the large or the small size such that said magnets may be moved to a position to attract the magnetic surface of the slides, a large size slide guide means associated with one of said magnets, a small size slide guide means associated with the other of said magnets, and means selectively movable to block said large size slide guide means when a slide tray having small size slides is positioned on said support means so that only the magnet associated with said small size slide guide means is operative to attract a small size slide.

3. In a photographic slide projector adapted to selectively project either large or small size slides, each of which has an edge surface of magnetic material; a lamp, a condensing lens system, and an objective lens system mounted in relation to each other to produce an optical axis along which light from said lamp is projected; guide means for a large size slide, guide means for a small size slide, means mounting said guide means in spaced relation across said optical axis and between said condensing and objective lens systems so that a slide positioned in either of said guide means intercepts substantially all of the solid angle of light which is produced by said condensing lens system and impinges upon said objective lens system, slide changing means including a pair of magnets, one of which is associated with each of said guide means and is effective to move a slide therein to facilitate projection or changing of the slide, and means adapted to mount slide trays having either large size or small size slides such that said magnets cooperate therewith to attract slides mounted therein, and means cooperating with said magnets and adapted to render one or the other of said magnets ineffective, depending upon the size slide to be projected.

4. In a photographic slide projector adapted to selectively project either large or small size slides, each of which has an edge surface of magnetic material, a lamp, a condensing lens and an objective lens mounted in relation to each other to form an optical axis along which light from said lamp is projected; a wall member parallel to said projection axis having a large size and a small size window formed therein opposite the space between said condensing lens and said objective lens, said small and large size windows being adapted to pass the large or small size slide respectively, guide means for a large size slide, guide means for a small size slide, means mounting said guide means in alignment with said windows and extending across said optical axis so that slides may be moved from one side of said wall, through said windows and along said guide means into axial alignment with said optical axis such that substantially all of the solid angle of light which is produced by said condensing lens system intercepts the slide to produce maximum illumination efficiency, slide changing means including a pair of magnets, one of which is associated with each of said guide means and is effective to move along said guide means from a position adjacent said windows to a position where a slide is positioned in axial alignment with said projection axis, means adapted to mount slide trays having either large size or small size slides such that the magnetic edge surface of the slides may be moved into alignment with said windows, slide changing means cooperating with said magnets and adapted to cooperate with a slide tray to sequentially move the slide tray and bring the next slide into alignment with said windows, whereupon the slide is attracted by said magnets and may be moved into axial alignment with said optical axis for protection thereof, and means selectively operable to block one or the other of said windows to facilitate projection of either a large or a small size slide while rendering the other of said windows inoperative to receive a slide.

5. A photographic slide projector comprising; means including a lens system and a source of illumination defining an optical axis, a wall member having a slide receiving window adapted to allow a slide to pass edgeways through said wall member, means mounting said wall member on one side of said optical axis; a movable slide tray mounted on the other side of said wall member and having an open portion which moves past said window, said slide tray being adapted to hold a plurality of slides in a face to face relationship such that an edge of each of the slides is adapted to move into registry with said window, the edge of each of the slides having a magnetic portion; a movable control member movable between a slide viewing, an intermediate, and a slide changing position; a magnet, means mounting said magnet to said control member with an over-travel type connection; said control member when in said viewing position being effective to move said magnet to one side of said optical axis and position a slide at said optical axis for projection on a screen or the like, said control member when in said intermediate position being effective to move said magnet to the other side of said optical axis and to position said magnet within said window to thereby return the slide to said slide tray, lock means effective to lock said magnet within said window, slide tray advancing means, and means including said control member when moving between said intermediate and said slide changing position to actuate said slide tray advancing means to thereby move said slide tray and bring another slide into engagement with said magnet.

6. A slide tray adapter for use with a photographic slide projector, which projector is constructed and arranged to project either large or small slides and also is constructed and arranged to provide an elongated large size slide tray platform adapted to receive a large size slide tray and to move the slide tray by means of a slide tray advancing means which engages a gear rack formed in the large size slide tray, said adapter comprising; a member forming an elongated small size slide tray platform having means to receive and hold a small size slide tray in fixed position thereon, and a gear rack formed on the under side of said member from the small size slide tray, said gear rack being adapted to mate with the slide tray advancing means of the projector to facilitate movement of said member and the small size slide tray as a unit.

7. A photographic slide projector for use in projecting either large or small size slides on a screen or the like, comprising; a lamp, an objective lens spaced from said lamp to form an optical axis along which light from said lamp is projected, a wall member parallel to said optical axis having window means to receive either the large or the small size slides, a slide tray platform adjacent said wall member on the opposite side of said wall member from said optical axis, slide changing means including slide engaging means movably mounted relative to said wall member and adapted to selectively move slides from a tray which is positioned at said slide tray platform to said optical axis for projection of the slide, slide tray advancing means including means cooperating with said slide changing means and including drive means adapted to move a tray which is positioned at said slide tray platform to thereby bring a further slide into position with said window means after the projected slide has been returned to the slide tray by said slide engaging means, and further means constructed and arranged to selectively adapt said slide tray platform to receive either a large or a small size slide tray, said further means being constructed and arranged such that said slide engaging means and said drive means are cooperatively associated with whichever size slide tray is utilized.

8. A photographic slide projector for use in projecting either large or small size slides on a screen or the like, comprising; means including a lamp defining an optical axis for the projector along which light is projected, a wall member parallel to said optical axis having window means to selectively receive either the large or the small size slides, an elongated large size slide tray platform adjacent said wall member on the opposite side of said wall member from said optical axis adapted to receive a large size slide tray, slide changing means including slide engaging means movably mounted relative to said wall member and adapted to selectively move slides from a tray which is positioned at said slide tray platform to said optical axis for projection of the slide, slide tray advancing means including means cooperating with said slide changing means and including drive means adapted to engage a gear rack formed in the large size slide tray, an adaptor member forming an elongated small size slide tray platform having means to receive and hold a small size slide tray in a fixed position thereon, and a gear rack formed on the underside of said adaptor member, said gear rack being adapted to mate with said drive means to facilitate movement of said adaptor member and the small size slide tray as a unit.

9. In a slide projector, optical means defining a projection axis, a slide storage tray adapted to receive a plurality of individual photographic slides to be projected one at a time, a surface of magnetic material on each of said slides, means movably mounting said slide tray in spaced relation to said projection axis, slide changing means including a control member which is movable transverse of said projection axis, a magnet, lost motion means mounting said magnet to said control member, lock means normally locking said lost motion means to normally produce concurrent movement of said magnet and said control member, means cooperating with said lock means to unlock the same and thus allow independent movement of said magnet and said control member when a slide has been returned to the tray, slide tray advancing means, and means including said control member effective to move said slide tray to bring another of said slides into alignment with said magnet while said magnet remains stationary.

10. In a slide projector, optical means defining a projection axis, a slide storage tray adapted to receive a plurality of individual photographic slides in a side by side relationship, which slides are to be projected one at a time, each of the slides having magnetic material on an edge surface thereof, means mounting said slide tray in spaced relation to said projection axis such that said edge surface lies adjacent the projection axis, slide changing means including a control member which is movable transverse said projection axis, a magnet, lost motion means mounting said magnet to said control member, lock means normally locking said lost motion means to produce concurrent movement of said magnet and said control member, guide means mounted transverse said projection axis and in alignment with said magnet, said control member being movable between a first position in which said magnet engages said edge surface of one of the slides and a second position, said magnet being effective during movement from said first to said second position to cause the slide to follow and ride in said guide means to a position in which said magnet positions the slide in alignment with said projection axis to project the same, means to unlock said lost motion means as a slide is returned to said slide tray, and slide tray advancing means cooperating with said control member and effective as a slide is returned to said slide tray to move said slide tray by virtue of said lost motion means to bring another of the slides into alignment with said magnet as said magnet remains stationary.

11. In a slide projector, optical means defining a projection axis for said slide projector, a slide storage tray having a plurality of compartments each of which is adapted to receive individual photographic slides having a surface of magnetic material, means mounting said slide tray in spaced relation to said projection axis such that the surface of magnetic material lies adjacent said axis, slide changing means having a control member which is movable across said axis from one side to the other, a magnet, lost motion means mounting said magnet to said control member, said control member being movable between a first position on one side of said axis in which position said magnet engages the magnetic surface of one of the slides while the slide is in position in said tray and a second position on the other side of said axis, said magnet in moving from said first to said second position being effective to move the one slide out of its compartment to a position in which the one slide is placed in alignment with said axis and is projected on a screen or the like, slide tray advancing means cooperating with said control member and effective as said slide changing means returns the one slide to its compartment to move said slide tray to bring another of the slides into alignment with said magnet as said magnet remains stationary by virtue of said lost motion means, and lock means cooperating with said control member and effective as said slide changing means moves away from said first position toward said second position to lock said slide tray in position to thereby insure that the individual slides are returned to their proper compartments within the slide tray.

12. In a slide projector, optical means defining an optical axis, a slide storage tray adapted to receive a plurality of individual photographic slides having a surface of magnetic material disposed along one edge thereof, means mounting said slide tray in spaced relation to said optical axis with the magnetic surface of the slides positioned immediately adjacent said optical axis, slide changing means including a control member which is movable across said optical axis, a magnet, lost motion means mounting said magnet to said control member, said control member being movable from a first position in which said magnet magnetically engages the magnetic surface of one of the slides and is effective to move to a second position in which said magnet positions the one slide in alignment with said optical axis to project the same, slide tray advancing means cooperating with said control member and effective as said slide changing means returns the one slide to its compartment to cause said slide tray to move and bring another of the slides into alignment with said magnet as said magnet remains stationary by virtue of said lost motion means, and further means adapted to be moved between a first and a second position and cooperating with said slide tray advancing means to cause said slide tray to selectively move in one direction or the other to thereby control the sequence in which the plurality of slides are projected.

13. A slide projector for use with a slide storage tray to selectively project a plurality of slides one at time, each of which slides includes a magnetic surface, comprising; means defining an optical axis along which a slide is adapted to be projected on a screen or the like; a movable control member, a magnet mounted in relation to said control member by a coupling having overtravel means and arranged to be moved as said control member moves between a slide projecting position and a slide changing position; lock means normally locking said overtravel means to produce concurrent movement of said magnet and said control member, said magnet being positioned to position a slide at said optical axis for projection thereof as said control member is moved to said slide projecting position, said magnet moving to a second position which returns the slide to its slide tray as said control member moves to a position intermediate said slide projecting position and said slide changing position; means effective to stop said magnet and to unlock said lock means at said second position as said control member continues to move a further distance to said slide changing position by virtue of said overtravel means, slide tray advancing means adapted to move the slide tray, and means controlled by said control member during movement through said further distance to actuate said slide tray advancing means.

References Cited in the file of this patent

UNITED STATES PATENTS

| | | |
|---|---|---|
| 2,552,211 | Perillo | May 8, 1951 |
| 2,579,281 | Tuck | Dec. 18, 1951 |
| 2,590,492 | Bennett et al. | Mar. 25, 1952 |
| 2,774,472 | Badalich | Dec. 18, 1956 |
| 2,878,719 | Lutes | Mar. 24, 1959 |
| 2,900,074 | Windman | Aug. 18, 1959 |
| 2,936,672 | May et al. | May 17, 1960 |
| 2,949,814 | Boughton et al. | Aug. 23, 1960 |

FOREIGN PATENTS

| | | |
|---|---|---|
| 843,954 | France | Apr. 11, 1939 |